United States Patent [19]

Wolff et al.

[11] Patent Number: 4,711,642

[45] Date of Patent: Dec. 8, 1987

[54] LIQUID, WATER CONTAINING MONO-FLUORO-TRIAZINYL REACTIVE DYESTUFF PREPARATION WITH PH 8-12

[75] Inventors: Joachim Wolff, Bergisch Gladbach; Karlheinz Wolf, Leverkusen, both of Fed. Rep. of Germany

[73] Assignee: Bayer Aktiengesellschaft, Leverkusen, Fed. Rep. of Germany

[21] Appl. No.: 906,352

[22] Filed: Sep. 11, 1986

[30] Foreign Application Priority Data

Sep. 28, 1985 [DE] Fed. Rep. of Germany ....... 3534729

[51] Int. Cl.[4] ...................... C09B 67/00; C09B 67/26; C09B 62/04; D06P 1/382
[52] U.S. Cl. .......................................... 8/527; 8/436; 8/549; 8/585; 8/586; 8/587; 8/609; 8/661; 8/686; 8/917; 8/918; 8/919
[58] Field of Search ............................ 8/527, 549, 859

[56] References Cited

U.S. PATENT DOCUMENTS

| | | | |
|---|---|---|---|
| 4,072,463 | 2/1978 | Schlafer et al. | 8/527 |
| 4,435,181 | 3/1984 | Hoguet et al. | 8/527 |
| 4,443,224 | 4/1984 | Opitz | 8/527 |
| 4,472,168 | 9/1984 | Gauthier | 8/527 |
| 4,500,321 | 2/1985 | Hugelshofer et al. | 8/527 |

FOREIGN PATENT DOCUMENTS 167952 1/1986 European Pat. Off. .

*Primary Examiner*—A. Lionel Clingman
*Attorney, Agent, or Firm*—Sprung Horn Kramer & Woods

[57] ABSTRACT

Liquid water-containing concentrated reactive dyestuff preparations of monofluorotriazinyl reactive dyestuffs with a pH value of at least 8, preferably 8.5-10, are stable on storage and display no noticeable hydrolysis, even after prolonged storage.

11 Claims, No Drawings

LIQUID, WATER CONTAINING MONO-FLUORO-TRIAZINYL REACTIVE DYESTUFF PREPARATION WITH PH 8–12

The present application relates to concentrated, water-containing preparations and reactive dyestuffs with a monofluorotriazinyl reactive radical, characterized by a pH value of at least ≧8, preferably 8.5–10.

The preparations, preferably solutions, in general contain 10 to 35% by weight of a monofluorotriazine dyestuff of the formula (1)

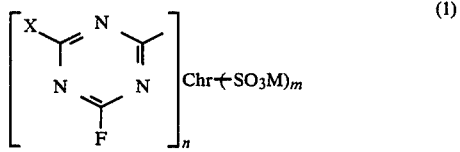

wherein
n = the integer 1 or 2,
m = an integer from 1 to 5,
$M^+ = H^+$, $Na^+$, $Li^+$ or $K^+$, preferably Li or mixtures of $Na^+/Li^+$,
$X = NH_2$, $NHR^1$, $OR^1$, $CH_2R^1$ or $SR^1$,
wherein
$R^1$ = alkyl (in particular $C_1-C_4$-alkyl which is optionally substituted by OH, $SO_3H$ or COOH), aryl (in particular phenyl which is optionally substituted by $SO_3H$, $C_1-C_4$-alkyl or $C_1-C_4$-alkoxy) or aralkyl (in particular benzyl which is optionally substituted by $SO_3H$, $C_1-C_4$-alkyl or $C_1-C_4$-alkoxy) and
CHr = a chromophoric system from the series comprising metal-free or metal-containing mono- or polyazo dyestuffs, metal-free or metal-containing azoporphine dyestuffs, such as copper, nickel or cobalt phthalocyanine dyestuffs, and the anthraquinone, oxazine, dioxazine, triphenylmethane, nitro, azomethine and metal-free or metal-containing formazan dyestuffs.

In addition to sulpho groups, the chromophoric system can contain other substituents customary in dyestuffs.

A large number of such dyestuffs are described in the literature (DE-A-1,644,208, DE-A-1,644,617 and DE-A-2,536,640).

If appropriate, the solutions can contain up to 30% by weight of water-miscible organic compounds which increase the solubility and are not capable of undergoing any reaction with the dyestuff which reduces the tinctorial strength, for example lower aliphatic or cyclic amides, preferably ε-caprolactam and its derivatives, and N-alkylpyrrolidones and/or sulphur-containing compounds, such as dimethyl sulphone, diethyl sulphone, sulpholene, sulpholane and derivatives thereof substituted in the α- or β-position, and/or hydrotropic compounds, such as urea and thiourea and derivatives thereof, or dicyandiamide and ethers of polyhydric alcohols. The solutions preferably contain 2 to 20% by weight of such compounds.

The solutions can furthermore contain customary standardizing agents, such as non-ionic or anionic dispersing agents, in particular polyvinylpyrrolidones or condensation products of aromatic sulphonic acids, such as naphthalenesulphonic acids, ditolyl ether-sulphonic acids or terphenylsulphonic acids, and formaldehyde.

The solutions according to the invention can moreover contain buffers for the pH range of 8–12. These are in general employed in amounts of up to about 5% by weight, preferably up to 1% by weight. Particularly suitable buffers here are those which are not capable of undergoing any reaction with the reactive radical which reduces the tinctorial strength, in particular alkali metal carbonate/alkali metal bicarbonate and, if appropriate, also phosphates.

The content of inorganic salts, such as LiCl, $Li_2SO_4$, NaCl and $Na_2SO_4$, should in general be less than 10% by weight, preferably less than 3% by weight.

Such products with a low salt content can be obtained in various ways:

(a) Manufactured goods or dried salt-containing manufactured goods are washed several times with distilled water and isolated again.

(b) The dyestuff slurry obtained during synthesis is desalinated and concentrated, by means of pressure permeation (DE-A-2,948,292).

(c) The process described in EP-A-87,703 is particularly suitable.

The concentrated solutions, according to the invention, of the reactive dyestuffs (1) are distinguished by a high storage stability at temperatures of −10° C. to 30° C. It is highly surprising that no noticeable hydrolysis of the reactive group occurs even after 4 weeks at 40° C., although these reactive dyestuffs are used for dyeing cotton at pH>8, HF being split off.

Storage-stable solutions of reactive dyestuffs are already known, for example from DE-A-2,529,658, DE-A-2,948,292 and DE-A-3,207,534. The solutions listed in the examples in general have a pH value between 3 and 8. However, if monofluorotriazine dyestuffs are stored at a pH value<8 at elevated temperatures for a prolonged period, drastic hydrolysis in general occurs, even with buffering, so that these solutions are no longer suitable for reactive dyeing of cotton (see Example 1). In contrast, it has been found, highly surprisingly, that concentrated solutions of the reactive dyestuffs of the formula (1) are stable towards hydrolysis only at a pH value>8, preferably ≧8.5.

The invention furthermore relates to the use of the solutions according to the invention for the preparation of dyebaths and printing pastes for use on natural and synthetic substrates, in particular cotton, wool, regenerated cellulose, silk, paper and leather.

EXAMPLE 1

150 g of the reactive dyestuffs of low salt content (<3% by weight) of the formula

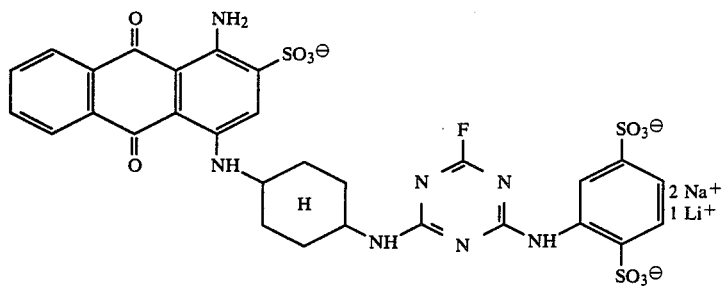

(2)

are dissolved in 100 g of ε-caprolactam and 750 g of purified water, the pH is brought to 8.7 with LiOH and the solution is buffered with 0.5% by weight of NaHCO₃/Na₂CO₃. The solution displays virtually no hydrolysis even after storage at 40° C. for 4 weeks.

If the corresponding dyestuff solution is brought to pH 6.5 and buffered, the reactive dyestuff (2) is hydrolysed to the extent of 60% after storage at 40° C. for 4 weeks.

EXAMPLE 2

150 g of the reactive dyestuff of low salt content (<2% by weight) of the formula

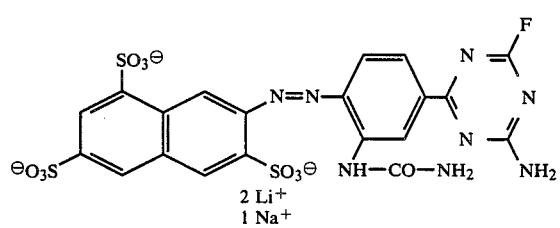

(3)

are dissolved in 840 g of water and 20 g of dicyandiamide, the pH is brought to 8.7 with LiOH and the solution is buffered with 0.5% by weight of NaHCO₃/Na₂CO₃.

EXAMPLE 3

120 g of the reactive dyestuff of low salt content (<2% by weight) of the formula

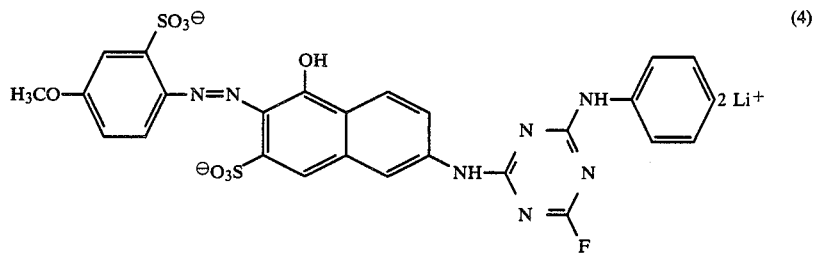

(4)

are dissolved in 870 g of water and 20 g of dicyandiamide, the pH is brought to 8.7 with LiOH.H₂O and the solution is buffered with 0.5% by weight of NaHCO₃/Na₂CO₃.

EXAMPLE 4

150 g of the reactive dyestuff of low salt content (<3% by weight) of the formula (5)

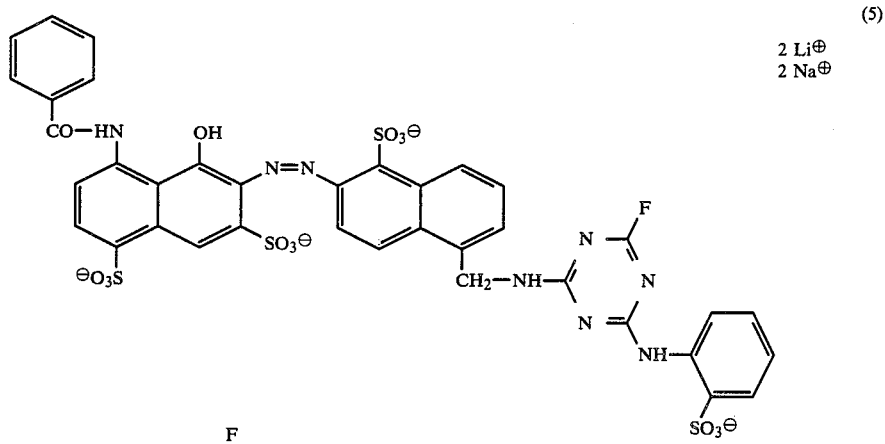

(5)

are dissolved in 100 g of ε-caprolactam and 750 g of purified water, the pH is brought to 8 with LiOH and the solution is buffered at this pH value with 0.5% by weight of NaHCO₃/Na₂CO₃.

We claim:

1. A liquid water-containing preparation of reactive dyestuffs with a monofluorotriazinyl reactive radical, characterized by a pH value of at least 8.

2. A preparation according to claim 1, containing 10–35% by weight of a dyestuff of the formula $$\left[ \begin{array}{c} X \diagdown_{C} \diagup^{N} \diagdown_{C} \diagup^{NH} \\ N \diagdown_{C} \diagup N \\ | \\ F \end{array} \right]_n Chr \text{-} (SO_3M)_m$$

wherein
  n = the integer 1 or 2,
  m = an integer from 1 to 5,
  M = H, Na, Li or K,
  X = $NH_2$, $NHR^1$, $OR^1$, $CH_2R^1$ or $SR^1$,
wherein
  $R^1$ = optionally substituted alkyl, optionally substituted aryl or optionally substituted aralkyl and
  CHr — a chromophoric system selected from metal-free or metal-containing azoporphine dyestuffs, and the anthraquinone, oxazine, dioxazine, triphenylmethane, nitro, azomethine and metal-free or metal-containing formazane dyestuffs.

3. A preparation according to claim 1, containing up to 30% by weight of a lower aliphatic or cyclic amide, dimethyl sulphone, diethyl sulphone, sulpholene, sulpholane or derivatives thereof substituted in the α- or β-position, urea and thiourea and derivatives thereof, dicyandiamide and ethers of polyhydric alcohols.

4. A preparation according to claim 1, containing <5% by weight of buffer substances for the pH range 8–12.

5. A preparation according to claim 1, containing $HCO_3^{\ominus}/CO_3^{-2}$ buffers.

6. A preparation according to claim 1, containing ε-caprolactam and/or dicyandiamide.

7. A preparation according to claim 1, containing at least 1 mol of $Li^+$ per mol of dyestuff.

8. A preparation according to claim 1 having a pH value $\geq 8.5$.

9. A preparation according to claim 2 wherein
  M = Li or mixtures of Na/Li and
  $R^1$ is an unsubstituted $C_1$–$C_4$-alkyl or a $C_1$–$C_4$-alkyl substituted by OH, $SO_3H$ or COOH, unsubstituted aryl or aryl substituted by $SO_3H$, $C_1$–$C_4$-alkyl or $C_1$–$C_4$-alkoxy, unsubstituted aralkyl or aralkyl substituted by $SO_3H$, $C_1$–$C_4$-alkyl or $C_1$–$C_4$-alkoxy.

10. A preparation according to claim 9 wherein $R^1$ is unsubstituted phenyl or phenyl substituted by $SO_3H$, $C_1$–$C_4$-alkyl or $C_1$–$C_4$-alkoxy, or unsubstituted benzyl or benzyl substituted by $SO_3H$, $C_1$–$C_4$-alkyl or $C_1$–$C_4$-alkoxy.

11. A preparation according to claim 2 wherein CHr = copper, nickel or cobalt phthalocyanine dyestuffs.

* * * * *